United States Patent
Wang et al.

(10) Patent No.: US 11,334,628 B2
(45) Date of Patent: May 17, 2022

(54) DRESSING RECOMMENDATION METHOD AND DRESSING RECOMMENDATION APPARATUS

(71) Applicant: BOE TECHNOLOGY GROUP CO., LTD., Beijing (CN)

(72) Inventors: Xueyun Wang, Beijing (CN); Enhui Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 797 days.

(21) Appl. No.: 16/094,589

(22) PCT Filed: Apr. 28, 2018

(86) PCT No.: PCT/CN2018/085101
§ 371 (c)(1),
(2) Date: Oct. 18, 2018

(87) PCT Pub. No.: WO2018/210124
PCT Pub. Date: Nov. 22, 2018

(65) Prior Publication Data
US 2021/0224326 A1    Jul. 22, 2021

(30) Foreign Application Priority Data

May 15, 2017    (CN) .......................... 201710339998.1

(51) Int. Cl.
*G06Q 30/00*    (2012.01)
*G06F 16/9035*    (2019.01)
(Continued)

(52) U.S. Cl.
CPC ........... *G06F 16/9035* (2019.01); *G01W 1/10* (2013.01); *G06F 16/906* (2019.01);
(Continued)

(58) Field of Classification Search
None
See application file for complete search history.

(56) References Cited

U.S. PATENT DOCUMENTS 5,930,769 A * 7/1999 Rose ................ G06Q 30/06
                                                        705/26.81
9,818,007 B1 * 11/2017 Bajovic ................ D06F 33/00
(Continued)

FOREIGN PATENT DOCUMENTS

CN    104778588 A    7/2015
CN    104809163 A    7/2015
(Continued)

OTHER PUBLICATIONS

No Author "Nonlinear Activation Functions in a Backpropagation Neural Network" Sep. 9, 2020. Retreived from https://www.baeldung.com/cs/ml-nonlinear-activation-functions (Year: 2020).*

(Continued)

*Primary Examiner* — Naeem U Haq
(74) *Attorney, Agent, or Firm* — Calfee, Halter & Griswold LLP

(57) ABSTRACT

Dressing recommendation method and apparatus are described. The dressing recommendation method includes: obtaining a first feature vector of each of a plurality of pieces of clothes to be recommended, the first feature vector including at least proportions of materials used in said each piece of clothes and a total weight of said each piece of clothes; learning the first feature vector by means of a machine learning model to obtain a second feature vector representing a target attribute of said each piece of clothes to be recommended, wherein the target attribute indicates a temperature range in which the piece of clothes is suitable for wearing; recommending clothes to a user according to (Continued)

the current weather information and the target attributes of the plurality of pieces of clothes to be recommended.

9 Claims, 5 Drawing Sheets

(51) Int. Cl.
| | |
|---|---|
| *G06F 16/906* | (2019.01) |
| *G06N 20/00* | (2019.01) |
| *G01W 1/10* | (2006.01) |
| *G06K 9/62* | (2022.01) |
| *G06N 3/04* | (2006.01) |
| *G06Q 30/06* | (2012.01) |

(52) U.S. Cl.
CPC ............. *G06K 9/6256* (2013.01); *G06N 3/04* (2013.01); *G06N 20/00* (2019.01); *G06Q 30/0631* (2013.01)

(56) References Cited

U.S. PATENT DOCUMENTS

| | | | |
|---|---|---|---|
| 10,664,903 B1* | 5/2020 | Haitani | ................. H04W 88/02 |
| 2007/0294141 A1* | 12/2007 | Bublitz | ................. G06Q 30/02 |
| | | | 705/26.62 |
| 2017/0090450 A1* | 3/2017 | Taite | ....................... A47B 61/00 |
| 2018/0084078 A1* | 3/2018 | Yan | ........................ H04L 67/327 |
| 2018/0165744 A1* | 6/2018 | Bajovic | .............. G06K 7/10297 |
| 2018/0173807 A1* | 6/2018 | Prakash | ............... G06Q 10/087 |

FOREIGN PATENT DOCUMENTS

| | | |
|---|---|---|
| CN | 106649383 A | 5/2017 |
| CN | 106649774 A | 5/2017 |
| CN | 106651533 A | 5/2017 |
| CN | 107066628 A | 8/2017 |
| CN | 107133292 A | 9/2017 |

OTHER PUBLICATIONS

Search Report and Written Opinion for International Application No. PCT/CN2018/085101 dated Jul. 6, 2018.

Li Yandong et al., "Survey of convulutional neural network", Journal of Computer Applications, 2016,36 (9) :2508-2515, 2565; ISSN 1001-9081; http://www.joca.cn; China Academic Journal Publishing House.

First Office Action for Chinese Patent Application No. 201710339998.1 dated Jun. 5, 2019.

* cited by examiner

DRESSING RECOMMENDATION METHOD AND DRESSING RECOMMENDATION APPARATUS

RELATED APPLICATION

The present application is the U.S. national phase entry of PCT/CN2018/085101, with an international filing date of Apr. 28, 2018, which claims the benefit of Chinese Patent Application CN201710339998.1 filed on May 15, 2017, the entire disclosures of which are incorporated herein by reference.

TECHNICAL FIELD

The present disclosure relates to the field of artificial intelligence, in particular to a dressing recommendation method and a dressing recommendation apparatus.

BACKGROUND

Artificial Intelligence (AI) is a new science of technology which studies and develops theories, methods, techniques and application systems for simulating, extending and expanding human intelligence. Artificial intelligence is a branch of computer science which attempts to understand the nature of intelligence and to produce a new intelligent machine that can respond in a similar way to human intelligence. Types of research in this field include robots, voice recognition, image recognition, natural language processing, expert systems, and so on.

Usually, before going out, a user will open some weather query websites or applications on the mobile phone to query the weather condition and then choose clothes suitable for said weather condition from a wardrobe. The process of making decisions about the clothes usually consumes some time of the user, nevertheless, sometimes wrong clothes are worn (i.e. the clothes chosen are not suitable), and the user will feel too hot or too cold after going out.

Choosing clothes suitable for the weather condition from the wardrobe according to the user's experience has problems like time-consuming and wearing wrong clothes.

SUMMARY

The present disclosure intends to solve the above-mentioned technical problem at least partially.

To this end, according to an aspect of the present disclosure, a dressing recommendation method is provided, which comprises:

obtaining a first feature vector of each piece of clothes among a plurality of pieces of clothes to be recommended, the first feature vector including at least proportions of materials used in said each piece of clothes and a total weight of said each piece of clothes;

learning the first feature vector by means of a machine learning model to obtain a second feature vector representing a target attribute of said each piece of clothes to be recommended, wherein the target attribute indicates a temperature range in which the piece of clothes is suitable for wearing;

recommending clothes to a user according to the current weather information and the target attributes of the plurality of pieces of clothes to be recommended.

Alternatively, the dressing recommendation method further comprises: determining whether the user chooses the recommended clothes; if the user does not choose the recommended clothes, adjusting the second feature vector corresponding to the recommended clothes; and updating the target attribute of corresponding clothes to be recommended based on the adjusted second feature vector.

Alternatively, said adjusting the second feature vector comprises adjusting the second feature vector using a non-linear activation function.

Alternatively, said adjusting the second feature vector using the non-linear activation function comprises: determining an adjustment parameter for the non-linear activation function based on historical data related to the user's choice of the recommended clothes; and adjusting the second feature vector using the non-linear activation function by means of the adjustment parameter.

Alternatively, the dressing recommendation method comprises: before obtaining the first feature vector of each piece of clothes among the plurality of pieces of clothes to be recommended, collecting first feature vectors of a plurality of pieces of sample clothes for training;

inputting the first feature vectors of the plurality of pieces of sample clothes and second feature vectors representing target attributes of the plurality of pieces of sample clothes into an initial machine learning model for training so as to obtain the machine learning model.

Alternatively, the machine learning model is a convolutional neural network.

Alternatively, said obtaining the first feature vector of each piece of clothes among the plurality of pieces of clothes to be recommended comprises: obtaining an identification code of the each piece of clothes to be recommended; obtaining feature description information of the each piece of clothes to be recommended according to the identification code; extracting the first feature vector of the each piece of clothes to be recommended from the feature description information.

According to a second aspect of the present disclosure, a dressing recommendation apparatus is provided, which comprises:

an obtaining circuit configured to obtain a first feature vector of each piece of clothes among a plurality of pieces of clothes to be recommended, the first feature vector including at least proportions of materials used in said each piece of clothes and a total weight of said each piece of clothes;

a learning circuit configured to learn the first feature vector by means of a machine learning model to obtain a second feature vector representing a target attribute of said each piece of clothes to be recommended, wherein the target attribute indicates a temperature range in which the plurality of piece of clothes is suitable for wearing;

a recommending circuit configured to recommend clothes to a user according to the current weather information and the target attributes of the plurality of pieces of clothes to be recommended.

According to a third aspect of the present disclosure, another dressing recommendation apparatus is provided, which comprises:

a processor;

a memory for storing computer-executable instructions executable on the processor, wherein any one of the above-mentioned dressing recommendation method is implemented when the processor executes the computer-executable instructions.

According to a fourth aspect of the present disclosure, a non-temporary computer-readable storage medium is provided, which stores computer-executable instructions that, when being executed by a computer, implement any one of the above-mentioned dressing recommendation method.

According to a fifth aspect of the present disclosure, a computer program product is provided, which comprises computer-executable instructions that, when being executed, implement any one of the above-mentioned dressing recommendation method.

Additional aspects and advantages of the present disclosure will be given in and become more apparent from the descriptions below.

BRIEF DESCRIPTION OF THE DRAWINGS

The above and/or additional aspects and advantages of the present disclosure will become apparent and easily understandable from the following descriptions of the embodiments given with reference to the drawings, wherein.

DETAILED DESCRIPTION

Figure 1:
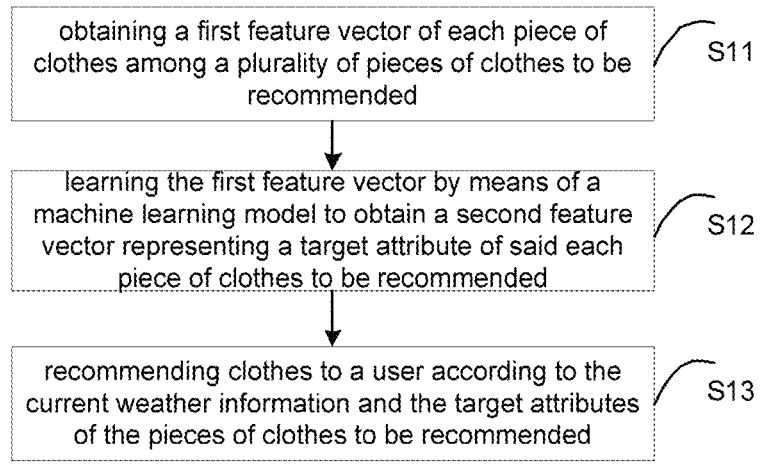
FIG. 1 is a schematic flow chart of a dressing recommendation method provided by an embodiment of the present disclosure.

Embodiments of the present disclosure will be described in detail below, and examples of the embodiments are shown in the drawings. The same or similar numerals are used throughout the drawings to indicate the same or similar elements or elements having the same or similar functions. The embodiments described below with reference to the drawings are exemplary, and they only intend to explain the present disclosure, but they cannot be construed as limiting the present disclosure.

The dressing recommendation method and apparatus according to embodiments of the present disclosure will be described below with reference to the drawings.

FIG. 1 is a schematic flow chart of a dressing recommendation method provided by an embodiment of the present disclosure. Said method can be implemented through an application client. For example, said method can be applied to newly developed clients or to existing weather clients. Said clients can be installed on such intelligent terminals as smart mobile phones and tablet PCs to recommend clothes suitable for the weather condition of the day to the user.

As shown in FIG. 1, the dressing recommendation method comprises the following steps S11-S13.

At step S11, a first feature vector of each of a plurality of pieces of clothes to be recommended is obtained, the first feature vector including at least proportions of materials used in said each piece of clothes and a total weight of said each piece of clothes.

The booming of Internet of things, artificial intelligence and big data indicates that the world of Internet of everything is approaching. Relevant data of various entities in life will be stored in databases so as to be called at any time to facilitate people's lives. For example, there are clear component materials, quality labels and a simple analysis of heat preservation index for each piece of clothes during its manufacturing. Information like the component materials, the quality labels and the heat preservation index of the clothes can be stored in a database for reference by the user when choosing clothes and to provide a foundation for realizing the dressing recommendation method described in the embodiments of the present disclosure.

In the era of Internet of things, each piece of clothes can be provided with an identification code when being manufactured, said identification code can be a Quick Response (QR) code or a code consisting of letters and/or numbers. For example, when the identification code of a piece of clothes is a QR code, the user can call the camera on the intelligent terminal through the application client, and then scan the QR code on the clothes with the camera. The QR code can be fed back to the server once it is acquired, so that feature description information of the clothes corresponding to said QR code can be obtained from the database of the server. Generally speaking, the obtained description information of a piece of clothes may include the brand, the manufacturer, the names of components, the weight of the piece of clothes, the proportions of weights of respective components, the weather temperature in which the piece of clothes is suitable to be worn, and so on.

As another example, when the identification code of a piece of clothes is a code consisting of letters and/or numbers, said code can be manually entered by the user into a corresponding input box on the client so as to be sent to the server, or it can be photographed by the camera and then sent to the server for image recognition, and the server can obtain feature description information of the piece of clothes from the database according to the recognized code.

In this embodiment, first feature vectors of clothes to be recommended can be obtained from description information of the clothes to be recommended.

In the embodiments of the present disclosure, obtaining the first feature vectors of the clothes to be recommended may include obtaining identification codes of the clothes to be recommended; obtaining feature description information of the clothes to be recommended according to the identification codes; and extracting the first feature vectors of the clothes to be recommended from the feature description information. That is to say, the identification codes of the clothes to be recommended can be obtained first, then the identification codes on the clothes to be recommended are scanned or read so as to obtain feature description information of the clothes to be recommended from the server; after that, information relating to warmth is extracted from the feature description information and is vectorized; and finally, the first feature vectors of the clothes to be recommended are obtained.

The degree of warmth of a piece of clothes is usually related to the thickness of the piece of clothes and the textile materials used. In this embodiment, the first feature vectors can be obtained according to proportions of the textile materials of the clothes to be recommended. Suppose that there are altogether n types of textile materials involved in a piece of clothes to be recommended including cotton, nylon, wool, etc., with a total weight of m grams, then the first feature vector of the piece of clothes to be recommended can be represented as $X=[x_1, x_2, L, x_n, x_{n+1}]$ by a vector of (n+1) dimensions, wherein, $x_i$ (i=1, 2, L, n) represents the proportion of weight of an $i^{th}$ textile material in the piece of clothes to be recommended, $x_{n+1}$ represents the weight of the piece of clothes to be recommended, and i, n and m are all positive integers.

For example, if a certain piece of clothes to be recommended is made of cotton and nylon and is weighted 500 grams, and the weight proportion of each of the two textile materials is 50%, then $x_1=0.5$, $x_2=0.5$, $x_3=0$, $x_4=0$, . . . , $x_n=0$, $x_{n+1}=500$, and the first feature vector of said piece of clothes to be recommended can be represented as X=[0.5, 0.5, 0, 0, L, 0, 500].

At step S12, the first feature vector is learned by means of a machine learning model to obtain a second feature vector representing a target attribute of said each piece of clothes to be recommended, wherein the target attribute indicates a temperature range in which the piece of clothes is suitable for wearing.

In this embodiment, the machine learning model is a convolutional neural network, and a good learning effect can be achieved by learning with said convolutional neural network to obtain the second feature vector representing the target attribute of said each piece of clothes to be recommended. It shall be noted that the convolutional neural network is merely an example, but it does not limit the present disclosure, and the machine learning model includes, but is not limited to, the convolutional neural network.

For example, the weather temperature can be divided into 7 temperature ranges, i.e. (−, 0), [0, 10), [10, 20), [20, 25), [25, 30), [30, 35) and [35, +), wherein the unit of temperature is degree Celsius, and said 7 temperature ranges correspond to 7 labels of A, B, C, D, E, F and G.

In this embodiment, by inputting the obtained first feature vectors of the clothes to be recommended into a pre-trained machine learning model, the second feature vectors representing the target attributes of said clothes to be recommended can be obtained, and the target attributes of the clothes to be recommended can be obtained.

For example, in this embodiment, it is supposed that the temperature suitable for wearing a common coat is 27° C., the temperature suitable for wearing a woolen coat is 6° C., and the temperature suitable for wearing a down jacket is −5° C. When the common coat, woolen coat and down jacket are clothes to be recommended, the first feature vectors of said three types of clothes to be recommended are input one by one into the machine learning model to be learned so as to obtain the second feature vectors indicating that the target attributes of said three types of clothes to be recommended are [25, 30), [0, 10) and (−, 0), respectively.

At step S13, clothes are recommended to a user according to the current weather information and the target attributes of the plurality of pieces of clothes to be recommended.

In this embodiment, after obtaining the target attributes of the clothes to be recommended, the current weather information can be further obtained, i.e. the current weather temperature is obtained. Then, clothes are recommended to the user according to the current weather information and the target attributes of the clothes to be recommended.

The clothes to be recommended are still the common coat, woolen coat and down jacket, for example, and the obtained target attributes are [25, 30), [0, 10) and (−, 0), respectively. If the current weather temperature is 3° C., then the woolen coat is recommended to the user according to the target attributes and the weather temperature.

In the dressing recommendation method provided in this embodiment, the first feature vectors of the clothes to be recommended are obtained first, then the first feature vectors are input into the machine learning model to be learned so as to obtain the second feature vectors, and the target attributes of the clothes to be recommended can be obtained thereby; finally, clothes are recommended to the user according to the current weather information and the target attributes of the clothes to be recommended. In this way, clothes that are suitable for the current weather condition can be recommended intelligently to the user, thus reducing the time consumed by the user for choosing clothes and reducing the probability of the user wearing wrong clothes.

Since different users have different heat and cold tolerances, even if coats of the same material are worn, some users may feel that it is not warm enough, while others may feel that it is too hot. Therefore, in order to realize personalized recommendation of clothes for individual users, an embodiment of the present disclosure further proposes another dressing recommendation method.

Figure 2:
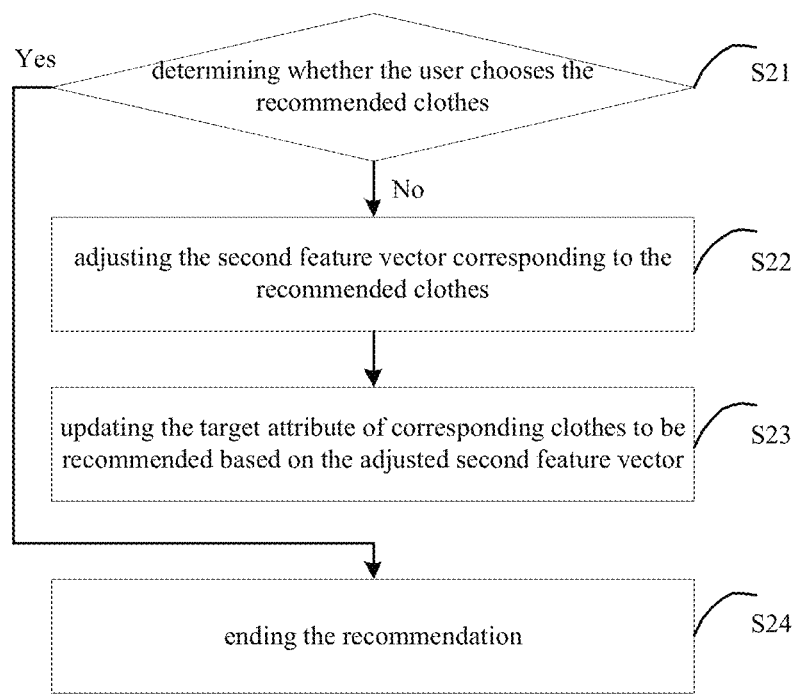
FIG. 2 is a schematic flow chart of a dressing recommendation method provided by another embodiment of the present disclosure.

FIG. 2 is a schematic flow chart of a dressing recommendation method provided by another embodiment of the present disclosure. As shown in FIG. 2, said dressing recommendation method may further comprise the following steps S21-S24 after the step S13 as illustrated in FIG. 1.

At step S21, it is determined whether the user has chosen the recommended clothes. When plurality of pieces of clothes are recommended, it is determined whether the user has chosen one of the recommended clothes.

In this embodiment, after recommending clothes to the user, a determination of whether the user has chosen the recommended clothes can be further made. If the user has chosen the recommended clothes, step S24 is performed; if the user has not chosen the recommended clothes, step S22 is performed.

Figure 3:
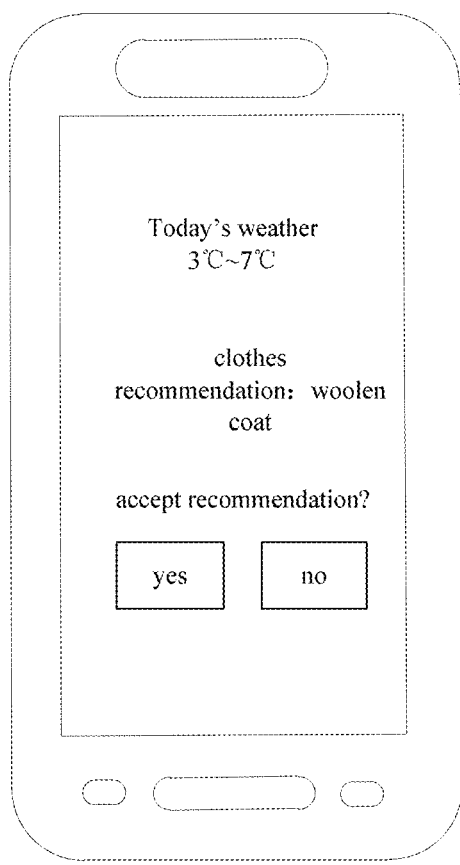
FIG. 3 is a schematic drawing of a dressing recommendation display interface according to an embodiment of the present disclosure.

Alternatively, a client having the dressing recommendation function can be provided with a dressing recommendation display interface for displaying to the user coats that are suitable for wearing on that day, i.e. recommended clothes. FIG. 3 is a schematic drawing of such a dressing recommendation display interface. As shown in FIG. 3, today's (current) weather temperature is 3° C.~7° C., and the suitable clothes recommended to the user are woolen coats. A user selection is also shown on the dressing recommendation display interface in FIG. 3, which asks the user "whether to accept the recommendation or not", and two touch buttons of "YES" and "NO" are provided for the user to select. When the user touches the "YES" button, it can be determined that the user accepts the recommended clothes, then the recommendation ends; when the user touches the "NO" button, it can be determined that the user does not accept the recommended clothes, and then a new recommendation of clothes should be made to the user.

Figure 4:
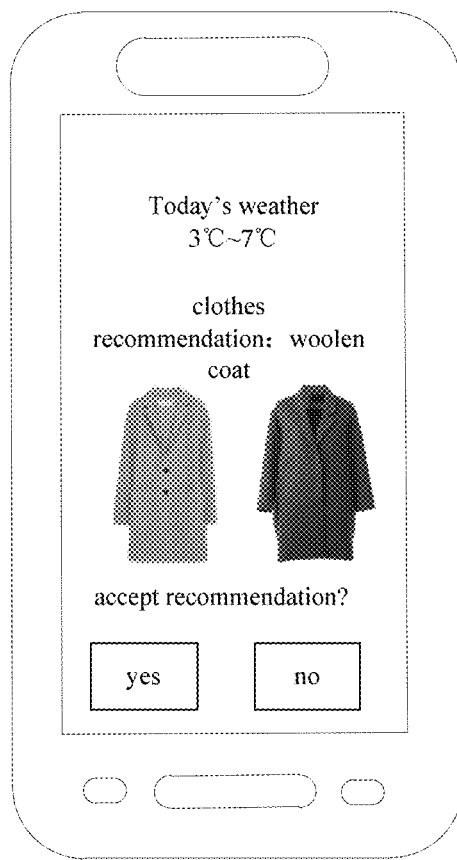
FIG. 4 is a schematic drawing of another dressing recommendation display interface according to an embodiment of the present disclosure.

Alternatively, when collecting information of clothes in the wardrobe of the user, a picture can be taken for each piece of clothes. In the dressing recommendation display interface shown in FIG. 4, pictures of the clothes can be displayed on the dressing recommendation display interface to facilitate the user to quickly locate the selected piece of clothes from the wardrobe. In practical application, the user may have a plurality of pieces of woolen coats, then the plurality of pieces of woolen coats can be displayed simultaneously to the user on the dressing recommendation display interface shown in FIG. 4. In this case, the user can select a woolen coat that better matches other clothes worn, thereby improving the user's dressing experience.

At step S22, the second feature vector corresponding to the recommended clothes is adjusted. The second feature vector is obtained from the above-mentioned machine learning model, i.e. from step S12.

In this embodiment, when the user does not choose the recommended clothes, a new recommendation of clothes can be made to the user by adjusting the second feature vector corresponding to the recommended clothes and output by the machine learning model.

As an example, the second feature vector can be adjusted using a non-linear activation function. Specifically, adjusting the second feature vector using the non-linear activation function comprises: determining an adjustment parameter for the non-linear activation function based on data related to the user's historical choice of the clothes recommended by the machine learning model; and adjusting the second feature vector using the non-linear activation function on the basis of the adjustment parameter.

Figure 5:
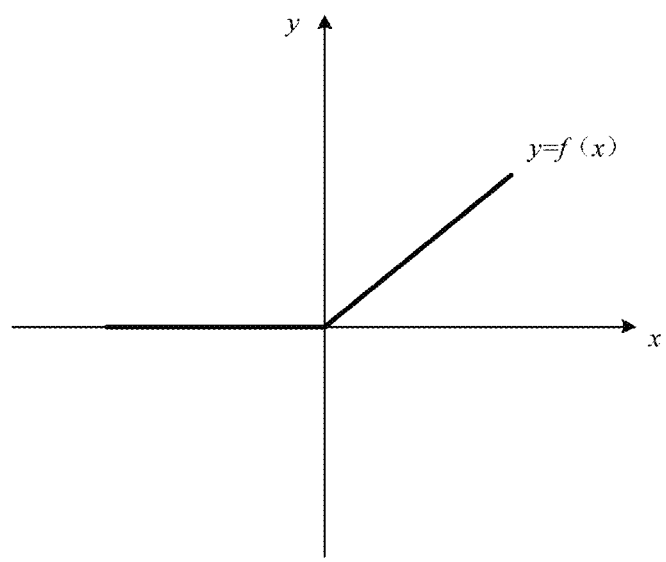
FIG. 5 is a schematic drawing of a ReLU activation function according to an embodiment of the present disclosure.

Alternatively, the non-linear activation function can be a Rectified Linear Units (ReLU) activation function. Suppose that the independent variable of the function is x, and the dependent variable is y, then the graph of y=f(x) is as shown in FIG. 5. The ReLU activation function has such a property as that when x is greater than or equal to 0, y remains unchanged; when x is less than 0, y equals 0.

If a second feature vector is represented by Z, and the vector adjusted by the non-linear activation function is indicated by Y, then:

$$Y=f(wZ+b)$$

wherein, w and b are matrixes, representing the adjustment parameters of the non-linear activation function determined in the way mentioned above.

In this embodiment, the values of w and b can be randomly initialized, and initialization of normal distribution can be used, for example. Less parameters are involved when adjusting the second feature vector using the non-linear activation function, besides, during recommendation, the parameters can be adjusted in real time through an on-line learning method, thus accuracy of adjustment can be increased and personalized recommendation of clothes can be realized.

At step S23, the target attribute of corresponding clothes to be recommended is updated based on the adjusted second feature vector.

In this embodiment, after adjusting the second feature vector, the target attributes of the clothes to be recommended can be updated based on the adjusted second feature vector so as to make a new recommendation of clothes to the user and meet the personalized need of the user.

For example, suppose that a user has poor cold tolerance, and for a piece of clothes, a second feature vector thereof is obtained by the machine learning model, which corresponds to a target attribute of [0, 10], but the user actually thinks that said piece of clothes is suitable for the temperature range of (10, 20], so when said piece of clothes is recommended to the user, the user would not choose it. In this case, the second feature vector can be adjusted using the non-linear activation function to obtain an adjusted second feature vector, then the target attribute of said piece of clothes can be updated into (10, 20] according to the adjusted second feature vector. When said piece of clothes serves as the clothes to be recommended again, the obtained target attribute corresponding to said piece of clothes is (10, 20]. When the current weather is in the temperature range of (10, 20], said piece of clothes will be recommended to the user.

At step S24, the recommendation is ended. In this embodiment, the dressing recommendation process ends after the user chooses the recommended clothes.

Alternatively, the client having the dressing recommendation function can be made to exit automatically when the present dressing recommendation ends. Of course, the user may voluntarily exit the client, which is not limited in this disclosure.

The dressing recommendation method provided in this embodiment first determines whether the user chooses the recommended clothes, and it adjusts the second feature vector output from the machine learning model when the user does not choose the recommended clothes, and updates the target attributes of the clothes to be recommended based on the adjusted second feature vector. Therefore, a closed loop feedback can be realized based on individual differences of users, and the target attributes of the clothes can be updated according to the data of historical choices of the user, accordingly, personalized dressing recommendation can be realized and the user's experience can be improved.

Figure 6:
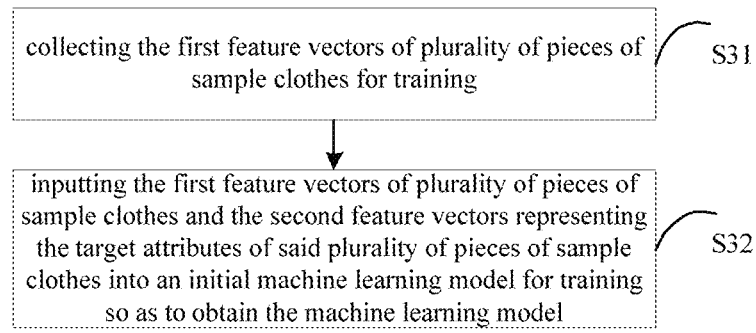
FIG. 6 is a schematic flow chart of a dressing recommendation method provided by yet another embodiment of the present disclosure.

In order to realize intelligent dressing recommendation based on the machine learning model, the machine learning model can be obtained in advance through training. As shown in FIG. 6, said dressing recommendation method may further comprise the following steps S31-S32 before the step S11 as described in FIG. 1.

At step S31, the first feature vector of each of a plurality of pieces of sample clothes for training is collected. The first feature vector includes at least proportions of different materials used in said each piece of sample clothes and a total weight of the piece of sample clothes.

As mentioned above, by scanning the identification code on the piece of clothes, description information of the piece of clothes can be obtained including the brand, the manufacturer, the names of components, the weight of the piece of clothes, the proportions of weights of respective components, the weather temperature in which the piece of clothes is suitable to be worn, etc. Then, the first feature vector can be extracted from said feature description information.

In this embodiment, a lot of clothes may be collected as sample clothes, For each of the clothes, identification code on it is scanned to obtain the feature description information of the piece of sample clothes, and information relating to warmth is extracted from the feature description information of the piece of sample clothes, such as names of components of the piece of sample clothes, weight of the piece of clothes, proportions of weights of respective components, weather temperatures in which it is suitable to be worn. Afterwards, said information relating to warmth can be used as training data for training so as to obtain the machine learning model. For example, the names of components of the piece of clothes, the weight of the piece of clothes, and the proportions of weights of respective components can be vectorized to obtain the first feature vector corresponding to the piece of the sample clothes, and the weather temperatures in which the corresponding piece of sample clothes is suitable to be worn are used as the target attributes corresponding to said piece of sample clothes.

At step S32, the first feature vectors of a plurality of pieces of sample clothes and the second feature vectors representing the target attributes of said plurality of pieces of sample clothes are input into an initial machine learning model for training so as to obtain the machine learning model.

In this embodiment, after obtaining the first feature vector and the target attribute corresponding to each piece of sample clothes, the first feature vector can be used as input of the initial machine learning model, and the second feature vector representing the target attribute of the piece of sample clothes can be used as output of the initial machine learning model, thereby training the initial machine learning model to obtain the machine learning model for realizing the dressing recommendation function. In order to improve recognition accuracy of the target attribute and reduce data processing difficulty, an output layer may be provided after the machine learning model for performing One-Hot Encoding of the target attribute output from the machine learning model, so that the second feature vector can be converted into a vector having a plurality of dimensions, in which only one dimension is 1 and the rest dimensions are all 0.

It shall be understood that the One-Hot encoding is also called one-bit valid encoding, whose principle is to encode N states using an N-bit state register, each state having its independent register bit, and only one bit is valid at any time. By means of the One-Hot encoding, data recognition accuracy can be improved and data processing difficulty can be reduced.

Suppose that the target attributes of the sample clothes correspond to the 7 temperature ranges (−, 0), [0, 10), [10, 20), [20, 25), [25, 30), [30, 35) and [35, +) as mentioned in the embodiment above, and said 7 temperature ranges correspond to 7 labels of A, B, C, D, E, F and G. After performing the One-Hot encoding by the output layer, each temperature range corresponds to a new 7-dimensional vector, so label A can be represented as [1, 0, 0, 0, 0, 0, 0], label B can be represented as [0, 1, 0, 0, 0, 0, 0], . . . , label G can be represented as [0, 0, 0, 0, 0, 0, 1].

Further, in the output layer, a probability of a second feature vector output from the machine learning model belonging to a specific label can be calculated using a softmax regression function.

For example, with respect to the above-mentioned 7 different labels, label A is denoted by number 1, label B is denoted by number 2, . . . , and label G is denoted by number 7. When an input X is given, a probability value $p(Y=i|X)$ is estimated for each category j (i.e each temperature range) using a hypothetical function, which indicates the probability of classifying X as category j. The output of the hypothetical function $h_\theta(X)$ is a 7-dimensional vector, as shown in equation (1):

$$h_\theta(X_i) = \begin{bmatrix} p(Y_i = 1 | X_i; \theta) \\ p(Y_i = 2 | X_i; \theta) \\ M \\ p(Y_i = 7 | X_i; \theta) \end{bmatrix} = \frac{1}{\sum_{j=1}^{7} e^{\theta_j^T X_i}} \begin{bmatrix} e^{\theta_1^T X_i} \\ e^{\theta_2^T X_i} \\ M \\ e^{\theta_7^T X_i} \end{bmatrix} \quad (1)$$

wherein, $X_i$ means the $i^{th}$ input, which indicates the second feature vector output from the machine learning model, where i=1, 2, . . . , m, m being the number of the input X; θ is a matrix, and $$\theta = \begin{bmatrix} \theta_1^T \\ \theta_2^T \\ \vdots \\ \theta_7^T \end{bmatrix},$$

which represents all training parameters of the 7 labels;

$$\frac{1}{\sum_{j=1}^{7} e^{\theta_j^T X_i}}$$

is used for normalizing the probability distribution so as to make the sum of all probabilities to be 1. In this embodiment, the category (temperature range) corresponding to the maximum probability is used as the target attribute corresponding to the second feature vector.

Take the convolutional neural network as an example, at the beginning of the design of the convolutional neural network, the model architecture parameters like the number of layers of the convolutional neural network, the number of nodes in each layer, the nonlinear transformation function and the convolution kernel can be determined according to experiences. When calculating the probability using the softwax regression function, a cost function as shown in equation (2) can be used to represent differences between results obtained from the training and the actual results, and the performance of the convolutional neural network can be detected according to said differences, thereby obtaining a relatively optimal model under the network model architecture. If the cost for optimizing the model is too high, the model architecture parameters of the convolutional neural network, such as the number of layers of the convolutional neural network, the number of nodes in each layer, the nonlinear transformation function and the convolution kernel, are adjusted, and the model is re-trained using the training data until a model with lower cost and high prediction accuracy is obtained.

$$J(\theta) = -\frac{1}{m}\left[\sum_{i=1}^{m}\sum_{j=1}^{7} 1\{Y_i = j\} \log \frac{e^{\theta_j^T X_i}}{\sum_{l=1}^{7} e^{\theta_l^T X_i}}\right]. \quad (2)$$

From this equation, a value of θ applicable to equation (1) can be obtained while minimizing the cost function J(θ).

In the embodiment of the present disclosure, the correspondence between the temperature ranges and the 7-dimensional vectors can be stored in the dressing recommendation client. On the basis of the machine learning model and output layer obtained in this embodiment, when the dressing recommendation client obtains the 7-dimensional vectors output by the output layer, it can determine the target attributes of the clothes to be recommended according to said 7-dimensional vectors, and then recommend clothes to the user according to the current weather information. For example, with respect to a piece of clothes, the vector output by the output layer is [1, 0, 0, 0, 0, 0, 0], and by looking up the correspondence between the temperature ranges and the 7-dimensional vectors, it can be determined that said vector corresponds to the target attribute (−, 0), then if the current weather temperature is below 0 degree Celsius, said piece of clothes will be recommended to the user.

The dressing recommendation method provided in this embodiment collects the first feature vectors of the sample clothes for training, and inputs the first feature vectors of the sample clothes as well as the second feature vectors representing the target attributes of the sample clothes into the initial machine learning model to be trained, thereby obtaining the machine learning model, and the accuracy of dressing recommendation can be improved as a result.

In order to implement the above embodiment, the present disclosure further provides a dressing recommendation apparatus.

Figure 7:
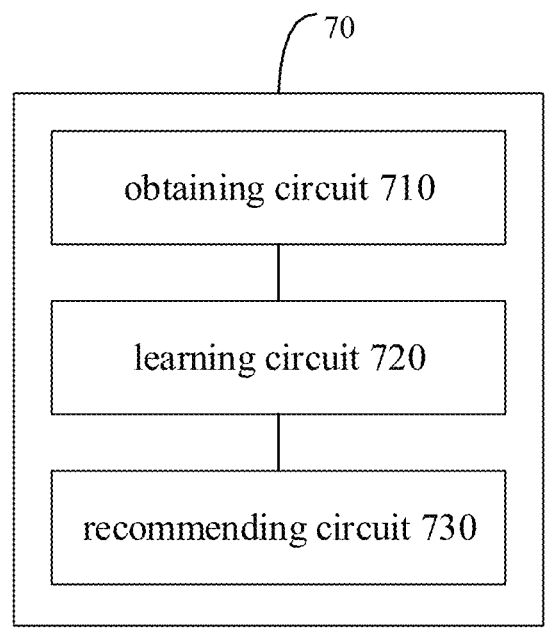
FIG. 7 is a schematic diagram of a dressing recommendation apparatus provided by an embodiment of the present disclosure.

FIG. 7 is a schematic diagram of a dressing recommendation apparatus provided by one embodiment of the present disclosure.

As shown in FIG. 7, a dressing recommendation apparatus 70 comprises: an obtaining circuit 710, a learning circuit 720 and a recommending circuit 730.

The obtaining circuit 710 is configured to obtain a first feature vector of each piece of clothes among a plurality of pieces of clothes to be recommended. The first feature vector includes at least proportions of materials used in the piece of clothes and a total weight of the piece of clothes. Specifically, the obtaining circuit 710 is configured to obtain an identification code of the piece of clothes to be recommended, obtain feature description information of the piece of clothes to be recommended according to the identification code, and extract the first feature vector of the piece of clothes to be recommended from the feature description information. The obtaining circuit can be an assembly for obtaining information, such as a camera, a scanner, etc.

The learning circuit 720 is configured to learn the first feature vector by means of the machine learning model so as to obtain the second feature vector representing the target attribute of said each piece of clothes to be recommended, wherein the target attribute indicates the temperature range in which the piece of clothes is suitable for wearing. The machine learning model can be a convolutional neural network, and by learning with the convolutional neural network, the target attribute of the piece of clothes to be recommended can be obtained, a better learning effect can be achieved and the rate of correctly classifying the target attribute can be increased. The learning circuit can be, for example, a processor, an application is specific integrated circuit, a FPGA, etc.

The recommending circuit 730 is configured to recommend clothes to the user according to the current weather information and the target attributes of the clothes to be recommended. The recommending circuit can also be a processor, an application specific integrated circuit, a FPGA, etc.

Figure 8:
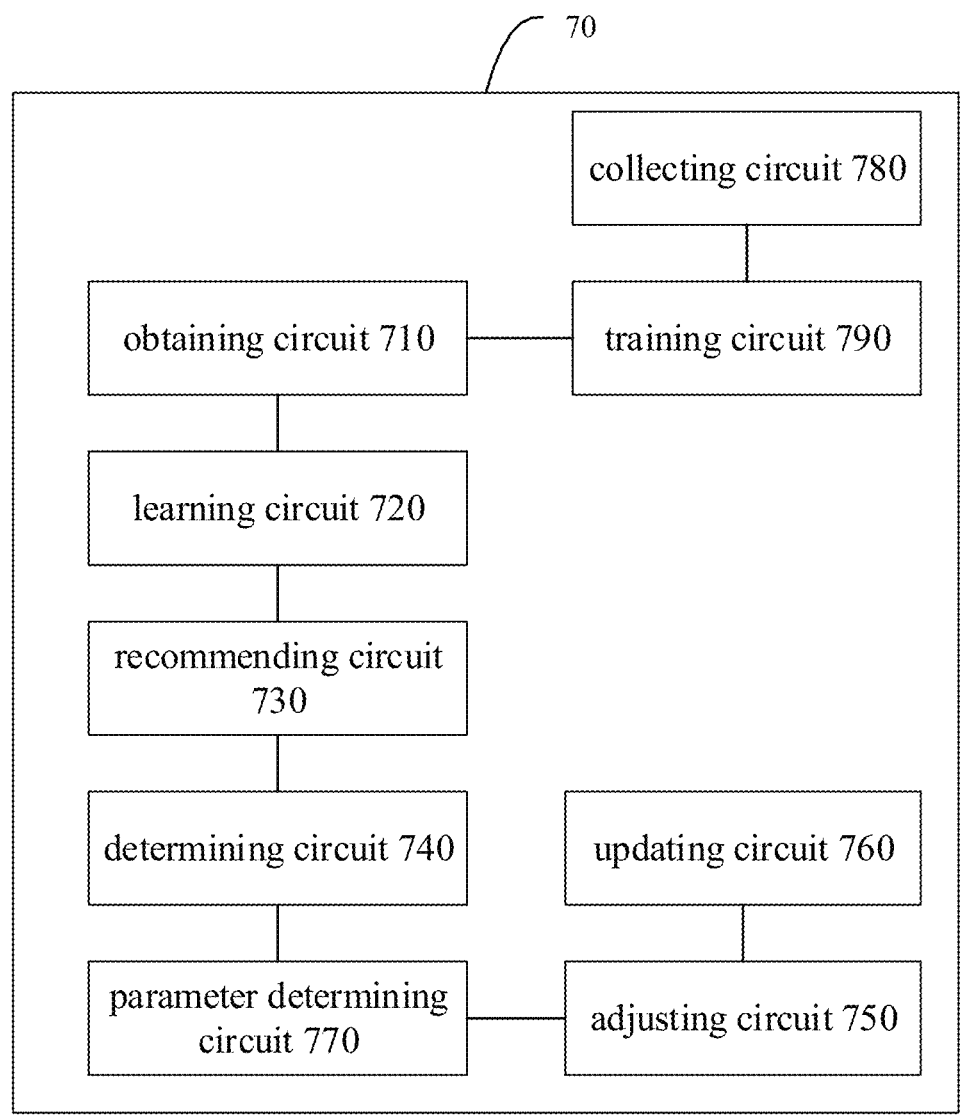
FIG. 8 is a schematic diagram of a dressing recommendation apparatus provided by another embodiment of the present disclosure.

Alternatively, in the embodiment of the present disclosure, as shown in FIG. 8, said dressing recommendation apparatus 70 may further comprise: a determining circuit 740, an adjusting circuit 750, an updating circuit 760, a parameter determining circuit 770, a collecting circuit 780 and a training circuit 790.

The determining circuit 740 is configured to determine whether the user chooses the recommended clothes. The adjusting circuit 750 is configured to adjust the second feature vector output from the machine learning model and corresponding to the recommended clothes if the user does not choose the recommended clothes. Specifically, the adjusting circuit 750 can be configured to adjust the second feature vector using the non-linear activation function. The updating circuit 760 is configured to update the target attribute of corresponding clothes to be recommended based on the adjusted second feature vector. The parameter determining circuit 770 is configured to determine the adjustment parameter for the non-linear activation function based on data related to the user's historical choice of clothes recommended by the machine learning model. Then the adjusting circuit 750 is configured to adjust the second feature vector using the non-linear activation function on the basis of the adjustment parameter. The collecting circuit 780 is configured to collect the first feature vector of each of a plurality of pieces of sample clothes for training. The training circuit 790 is configured to input the first feature vectors of the plurality of pieces of sample clothes and second feature vectors representing the target attributes of the plurality of pieces of sample clothes into the initial machine learning model for training so as to obtain the machine learning model.

It shall be noted that the above explanations about the embodiments of the dressing recommendation method are also applicable to the dressing recommendation apparatus provided in this embodiment, and the principle of the dressing recommendation apparatus is similar to that of the dressing recommendation method, so it won't be reiterated here.

In the dressing recommendation apparatus provided in this embodiment, the first feature vectors of the clothes to be recommended are obtained and the first feature vectors are input into the machine learning model to be learned so as to obtain the second feature vectors representing the target attributes of the clothes to be recommended. Finally, clothes are recommended to the user according to the current weather information and the target attributes of the clothes to be recommended. In this way, clothes that are suitable for the current weather condition can be recommended intelligently to the user, thus reducing the time consumed by the user for choosing clothes and reducing the probability of the user wearing wrong clothes.

The present disclosure further provides another dressing recommendation apparatus, comprising: a memory, a processor and a computer instruction stored on the memory and executable on the processor, which, when being executed by the processor, can implement the dressing recommendation method mentioned in the above embodiments.

The present disclosure further provides a computer-readable storage medium having computer-executable instructions stored thereon, which, when being executed by the computer, implement the dressing recommendation method mentioned in the above embodiments.

The present disclosure further provides a computer program product comprising computer-executable instructions, which when being executed, implement the dressing recommendation method mentioned in the above embodiments.

In this specification, descriptions made with reference to "one embodiment", "some embodiments", "an example", "a specific example" or "some examples" mean that the specific features, structures, materials or characteristics described with reference to said embodiment or example are included in at least one embodiment or example of the present disclosure. In this specification, schematic expressions of the above terms are not necessarily used for the same embodiment or example. Moreover, the described specific features, structures, materials or characteristics can be combined in appropriate ways in any one or more embodiments or examples. In addition, those skilled in the art can combine different embodiments or examples and features of different embodiments or examples described in this specification as long as no confliction is caused.

Furthermore, the terms "first" and "second" are only used for the sake of description, but they shall not be construed as indicating or suggesting any relative importance or implicitly indicating the number of the described technical feature. Therefore, a feature defined by "first" or "second" may express or explicitly mean that there is at least one said feature. In addition, in the claims, the word "comprise" does not mean to exclude other elements or steps, and the word "a" or "an" does not mean to exclude more than one. In the descriptions of the present disclosure, the term "a plurality of" means at least two, for example, two, three, etc., unless otherwise specified.

Any process or method illustrated in the flow charts or described herein in other ways can be construed as a module, segment or part representing codes of executable instructions including one or more steps for realizing a customized logical function or process, and the scope of the preferred embodiments of the present disclosure include further implementations, wherein the functions may not be performed according to the sequence shown or discussed (including substantially at the same time according to the functions involved or in an opposite sequence), which should be understood by those skilled in the art of the embodiments of the present disclosure.

Logics and/or steps shown in the flow charts or described in other ways herein, such as a sequencing list of executable instructions that can be considered as being used for realizing logical functions, can be specifically implemented in any computer-readable medium so as to be used by an instruction execution system, apparatus or device (e.g. a computer-based system, a system comprising a processor or other systems that can get instructions from the instruction execution system, apparatus or device and execute the instructions), or be used in combination with said instruction execution system, apparatus or device. As far as this specification is concerned, the "computer-readable medium" can be any apparatus that can include, store, deliver, propagate or transmit programs for use by or in combination with the instruction execution system, apparatus or device. More specific (but non-exhaustive) examples of the computer-readable medium include: an electrical connection part (electronic device) having one or more wirings, a portable computer disk box, random access memory (RAM), read-only memory (ROM), erasable and editable read-only memory (EPROM or flash memory), an optical fiber device, and a portable optical disk read-only memory (CDROM). In addition, the computer-readable medium can even be a piece of paper or other proper mediums on which the programs are printable, because, for example, the paper or other mediums can be optically scanned and then edited, interpreted or processed in other proper ways when necessary so as to obtain the programs in an electronic way, then the programs can be stored in the computer memory.

It shall be understood that the parts of the present disclosure can be realized by hardware, software, firmware or combinations thereof. In the above described embodiments, the steps or methods can be implemented by software or firmware stored in the memory and executed by appropriate instruction execution systems. For example, if they are implemented by hardware, any one of the following techniques in the art or combinations thereof can be used: a discrete logic circuit having a logic gate circuit, an application specific integrated circuit having appropriate combined logic gate circuits, a programmable gate array (PGA), a field programmable gate array (FPGA), etc.

Those ordinarily skilled in the art shall understand that all or some of the steps in the methods of the above embodiments can be carried out by corresponding hardware that is instructed by a program, and said program can be stored in a computer-readable storage medium, which, when being executed, implements one or combinations of the steps recited in the method embodiments.

In addition, some or all of the functional units described in the above embodiments of the present disclosure can be integrated in one module or circuit, or they can be embodied as separate modules or circuits. Said integrated modules or circuits can be realized either in the form of hardware or in the form of software. If said integrated modules or circuits are realized in the form of software and are sold or used as independent products, they can be stored in one computer-readable storage medium.

The above-mentioned storage medium can be a read-only memory, a magnetic disk, an optical disk, etc. Although the embodiments of the present disclosure have been illustrated and described in the text above, it shall be appreciated that the above embodiments are exemplary and they do not intend to limit the present disclosure. Those ordinarily skilled in the art can make changes, modifications, replacements and variations to the above embodiments without departing from the scope of the present disclosure.

The invention claimed is:

1. A dressing recommendation method, comprising:
collecting first feature vectors of a plurality of pieces of sample clothes for training;
inputting the first feature vectors of the plurality of pieces of sample clothes and second feature vectors representing target attributes of the plurality of pieces of sample clothes into an initial machine learning model for training so as to obtain a machine learning model;
after obtaining the machine learning model obtaining a first feature vector of each piece of clothes among a plurality of pieces of clothes to be recommended, the first feature vector including at least proportions of materials used in said each piece of clothes and a total weight of said each piece of clothes;
learning the first feature vector by means of the machine learning model to obtain a second feature vector representing a target attribute of said each piece of clothes to be recommended, wherein the target attribute indicates a temperature range in which the piece of clothes is suitable for wearing;
recommending clothes to a user according to current weather information and the target attributes of the plurality of pieces of clothes to be recommended;
in response to the user not choosing the recommended clothes, adjusting the second feature vector corresponding to the recommended clothes by using a non-linear activation function;
updating the target attribute of corresponding clothes to be recommended based on the adjusted second feature vector.

2. The dressing recommendation method according to claim 1, wherein adjusting the second feature vector using the non-linear activation function comprises:
determining an adjustment parameter for the non-linear activation function based on historical data related to the user's choice of the recommended clothes;
adjusting the second feature vector using the non-linear activation function by means of the adjustment parameter.

3. The dressing recommendation method according to claim 1, wherein the machine learning model comprises a convolutional neural network.

4. The dressing recommendation method according claim 1, wherein obtaining the first feature vector of each piece of clothes among the plurality of pieces of clothes to be recommended comprises:
obtaining an identification code of the each piece of clothes to be recommended;

obtaining feature description information of the each piece of clothes to be recommended according to the identification code;

extracting the first feature vector of the each piece of clothes to be recommended from the feature description information.

5. A non-transitory computer program product, comprising computer-executable instructions that, when being executed, implement a dressing recommendation method, the dressing recommendation method, comprising:

collecting first feature vectors of a plurality of pieces of sample clothes for training;

inputting the first feature vectors of the plurality of pieces of sample clothes and second feature vectors representing target attributes of the plurality of pieces of sample clothes into an initial machine learning model for training so as to obtain a machine learning model;

after obtaining the machine learning model obtaining a first feature vector of each piece of clothes among a plurality of pieces of clothes to be recommended, the first feature vector including at least proportions of materials used in said each piece of clothes and a total weight of said each piece of clothes;

learning the first feature vector by means of the machine learning model to obtain a second feature vector representing a target attribute of said each piece of clothes to be recommended, wherein the target attribute indicates a temperature range in which the piece of clothes is suitable for wearing;

recommending clothes to a user according to current weather information and the target attributes of the plurality of pieces of clothes to be recommended;

in response to the user not choosing the recommended clothes, adjusting the second feature vector corresponding to the recommended clothes by using a non-linear activation function;

updating the target attribute of corresponding clothes to be recommended based on the adjusted second feature vector.

6. A non-temporary computer-readable storage medium, storing computer-executable instructions that, when being executed by a computer, implement a dressing recommendation method comprising:

collecting first feature vectors of a plurality of pieces of sample clothes for training;

inputting the first feature vectors of the plurality of pieces of sample clothes and second feature vectors representing target attributes of the plurality of pieces of sample clothes into an initial machine learning model for training so as to obtain a machine learning model;

after obtaining the machine learning model obtaining a first feature vector of each piece of clothes among a plurality of pieces of clothes to be recommended, the first feature vector including at least proportions of materials used in said each piece of clothes and a total weight of said each piece of clothes;

learning the first feature vector by means of the machine learning model to obtain a second feature vector representing a target attribute of said each piece of clothes to be recommended, wherein the target attribute indicates a temperature range in which the piece of clothes is suitable for wearing;

recommending clothes to a user according to current weather information and the target attributes of the plurality of pieces of clothes to be recommended;

in response to the user not choosing the recommended clothes, adjusting the second feature vector corresponding to the recommended clothes by using a non-linear activation function;

updating the target attribute of corresponding clothes to be recommended based on the adjusted second feature vector.

7. The non-temporary computer-readable storage medium according to claim 6, wherein adjusting the second feature vector using the non-linear activation function comprises:

determining an adjustment parameter for the non-linear activation function based on historical data related to the user's choice of the recommended clothes;

adjusting the second feature vector using the non-linear activation function by means of the adjustment parameter.

8. The non-temporary computer-readable storage medium according to claim 6, wherein the machine learning model comprises a convolutional neural network.

9. The non-temporary computer-readable storage medium according claim 6, wherein obtaining the first feature vector of each piece of clothes among the plurality of pieces of clothes to be recommended comprises:

obtaining an identification code of the each piece of clothes to be recommended;

obtaining feature description information of the each piece of clothes to be recommended according to the identification code;

extracting the first feature vector of the each piece of clothes to be recommended from the feature description information.

* * * * *